(12) United States Patent
Gochenour

(10) Patent No.: US 7,204,166 B2
(45) Date of Patent: Apr. 17, 2007

(54) DUAL CLUTCH ASSEMBLY FOR A HEAVY-DUTY AUTOMOTIVE POWERTRAIN

(75) Inventor: Daniel V. Gochenour, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 245 days.

(21) Appl. No.: 10/983,531

(22) Filed: Nov. 8, 2004

(65) Prior Publication Data

US 2006/0096414 A1 May 11, 2006

(51) Int. Cl.
*F16D 13/38* (2006.01)

(52) U.S. Cl. .................................................. 74/340

(58) Field of Classification Search ............... 192/70, 192/48.91, 70.25, 70.3, 70.29; 74/340
See application file for complete search history.

(56) References Cited

U.S. PATENT DOCUMENTS

| | | | | |
|---|---|---|---|---|
| 2,371,804 A | * | 3/1945 | Cooke | 192/48.8 |
| 2,379,023 A | * | 6/1945 | Miller | 192/48.9 |
| 3,021,931 A | * | 2/1962 | Holz | 192/48.7 |
| 3,170,551 A | | 2/1965 | Cook | |
| 3,212,611 A | * | 10/1965 | Ruoff et al. | 192/48.8 |
| 3,215,233 A | * | 11/1965 | Smith et al. | 192/48.7 |
| 4,026,400 A | * | 5/1977 | Rawlings | 192/99 A |
| 4,210,232 A | * | 7/1980 | Beccaris | 192/48.8 |
| 4,296,644 A | * | 10/1981 | Sada et al. | 74/606 R |
| 4,489,621 A | | 12/1984 | McIntosh | |
| 4,489,622 A | | 12/1984 | Underwood | |
| 4,677,866 A | * | 7/1987 | Tone | 74/15.86 |
| 5,513,734 A | * | 5/1996 | Scotti | 192/70.27 |
| 5,678,669 A | * | 10/1997 | Rainer | 192/48.8 |
| 6,012,561 A | * | 1/2000 | Reed et al. | 192/70.29 |
| 6,397,994 B1 | * | 6/2002 | Bowen | 192/48.9 |
| 6,427,550 B1 | * | 8/2002 | Bowen | 74/336 R |
| 2003/0066729 A1 | | 4/2003 | Feldhaus et al. | |
| 2003/0079953 A1 | | 5/2003 | Carlson et al. | |
| 2003/0164275 A1 | | 9/2003 | Feldhaus et al. | |
| 2004/0084275 A1 | | 5/2004 | Orlamunder et al. | |
| 2004/0099499 A1 | | 5/2004 | Orlamunder et al. | |
| 2004/0108181 A1 | | 6/2004 | Orlamunder et al. | |
| 2004/0216296 A1 | | 11/2004 | Ahnert | |
| 2004/0231943 A1 | | 11/2004 | Berger et al. | |

FOREIGN PATENT DOCUMENTS

| | | |
|---|---|---|
| DE | 101 46 837 A1 | 5/2002 |
| DE | 103 08 517 A1 | 9/2004 |
| EP | 1 630 441 A1 | 3/2006 |
| FR | 2 871 106 A1 | 12/2005 |
| GB | 1 348 645 | 3/1974 |
| GB | 1 583 951 | 2/1981 |
| WO | WO 99/22955 | 5/1999 |

OTHER PUBLICATIONS

Ward's Auto World Magazine Publication dated Oct. 1, 2001.
SAE Publication dated 2000.

* cited by examiner

*Primary Examiner*—Sherry Estremsky
(74) *Attorney, Agent, or Firm*—Brooks Kushman P.C.

(57) ABSTRACT

A dual friction clutch assembly for a multiple-ratio transmission comprises separate friction disks of the assembly separately connected to each of two torque input shafts for the transmission. Two torque flow paths for the torque input shafts are defined in part by pre-engaged transmission clutches.

21 Claims, 7 Drawing Sheets

_US 7,204,166 B2_

DUAL CLUTCH ASSEMBLY FOR A HEAVY-DUTY AUTOMOTIVE POWERTRAIN

BACKGROUND OF THE INVENTION

1. Field of the Invention

The invention relates to a dual clutch for a heavy-duty powertrain with two torque input shafts and pre-selected transmission clutch engagements for multiple-ratio transmission gearing.

2. Background Art

Heavy-duty powertrains for trucks and other heavy-duty vehicles, both road vehicles and off-road vehicles, typically use a multiple-ratio synchronized transmission with a neutral clutch situated between torque input elements of the transmission and a vehicle engine, such as a high-torque, spark-ignition engine or a compression ignition Diesel engine. It is known design practice to use a transmission with a torque input gear that driveably engages one or more lay shafts, the torque input gear being coaxially disposed with respect to a torque output shaft. In powertrains of this type, multiple-range gearing may be used on the torque output side of the transmission to establish two or more torque ratio ranges. Power is delivered to vehicle traction wheels through a differential-and-axle assembly. Mechanical synchronizer clutch mechanisms may be mounted on each lay shaft, as well as on the common axis of the torque input gear and the torque output shaft.

The neutral clutch used with manually-controlled transmissions of this type must be opened and closed in sequence with actuation of the synchronizer clutch mechanisms during torque ratio changes. Release of the neutral clutch will result in interruption of torque delivery during a ratio shift event as synchronizer clutches establish and disestablish torque flow paths to a transmission main shaft, which in turn can be driveably connected to the transmission torque output shaft. In contrast, certain automated manual transmission systems may establish torque interruption to facilitate engagement and disengagement of the synchronizer clutches by defueling the engine during a ratio shift to momentarily interrupt engine torque delivery to the transmission torque input shaft. In the case of a spark-ignition, internal combustion engine, torque interruption can be effected also by momentarily retarding spark timing.

It is known design practice also to use a dual neutral clutch with dual friction disks in heavy-duty powertrains. The friction disks are engageable in tandem to establish a high torque capacity torque flow path and to interrupt torque delivery from the engine to a torque input shaft for the transmission during a gear ratio change event. Use of dual friction disks in a dual clutch reduces wear rate of the friction disks since the friction torque delivery burden is shared by two disks rather than a single friction disk. The operating diameter of each friction disk, furthermore, can be reduced, which improves the packaging efficiency of the powertrain in the vehicle.

SUMMARY OF THE INVENTION

The invention comprises a heavy-duty dual clutch assembly for use in an automated manual transmission of the kind described in the preceding discussion. The dual clutch assembly of the invention can be used with an automated manual transmission having one or more lay shafts in parallel disposition with respect to a main shaft. The dual clutch assembly of the invention eliminates the need for momentarily defueling the engine or for momentary engine spark timing delay by establishing two torque flow paths through the gearing. Separate torque input shafts are connected to each of two torque input gear elements of the transmission. During a ratio shift, torque interruption in the transmission is achieved by selectively disengaging separate friction disks in the clutch assembly. Each friction disk is separately activated as it engages a separate clutch plate, and each is driveably connected to a separate one of the two torque input shafts. The friction disks are activated by a lever assembly under the control of at least one automated actuator.

In a first embodiment of the invention, two actuators are used to activate a separate set of levers for each friction disk. In one operating mode for that embodiment, the dual clutch assembly is normally open prior to the start of a launch. At the start of engagement, the synchronizer clutches for both first and second ratios are pre-engaged and the friction disk for the first ratio then is engaged. A ratio shift to the second ratio then is accomplished by swapping friction disks (i.e., the first ratio friction disk is disengaged and the second ratio friction disk is engaged).

In another operating mode for the embodiment of the invention with separate sets of levers for each friction disk, the dual clutch assembly is normally open prior to the start of a launch. At the start of engagement of the dual clutch assembly during an initial stage of the launch, each friction disk is partially engaged as engine torque is delivered through the dual clutch assembly to each torque input shaft. The synchronizer clutches for both first and second ratios are pre-engaged and both friction disks will slip at the start of engagement of the dual clutch assembly. At a later stage of the engagement, the friction disk for the second ratio is disengaged and the friction disk for the first ratio is fully engaged. The synchronizer clutch for the second gear ratio remains engaged. Since engine torque is delivered to each torque input shaft during the initial stage of a launch, the wear rate of each friction disk is reduced.

A ratio change from the first ratio to the second ratio will occur as the friction disk for the second ratio is engaged and the friction disk for the first ratio is disengaged. Ratio shifts to the third and fourth ratios are achieved by swapping friction disk engagements and disengagements while pre-engaging the synchronizer clutches in the ratio shift sequence.

This pattern of selective engagement and disengagement of the friction disks avoids the need for momentarily defueling the engine or momentarily retarding spark timing for the engine during a so-called automated power shift pattern.

The dual clutch assembly of an alternate embodiment of the invention may include a pre-loaded plate spring between two friction clutch plates that define a friction clutch plate sub-assembly. The pre-load on the plate spring permits the dual clutch assembly to be normally open when it is not activated. The plate spring will maintain a clamping load on the friction disks. It also will also cap off the clutch plate load during a vehicle launch, which reduces the amount of work required by the actuators. That is, it will establish a threshold for friction disk load as the set of levers for the engaged clutch plate sub-assembly is activated by the actuator. This makes it possible to design the actuator with a lower torque limit. This feature is a characteristic also of the first embodiment of the invention described above.

According to another alternate embodiment of the invention, only a single actuator is required. The actuator levers of each set of actuator levers for the separate friction disks have active ends that are mechanically connected to the single actuator as the levers are moved into engagement position and out of engagement position.

DETAILED DESCRIPTION OF EMBODIMENTS OF THE INVENTION

Figure 1:
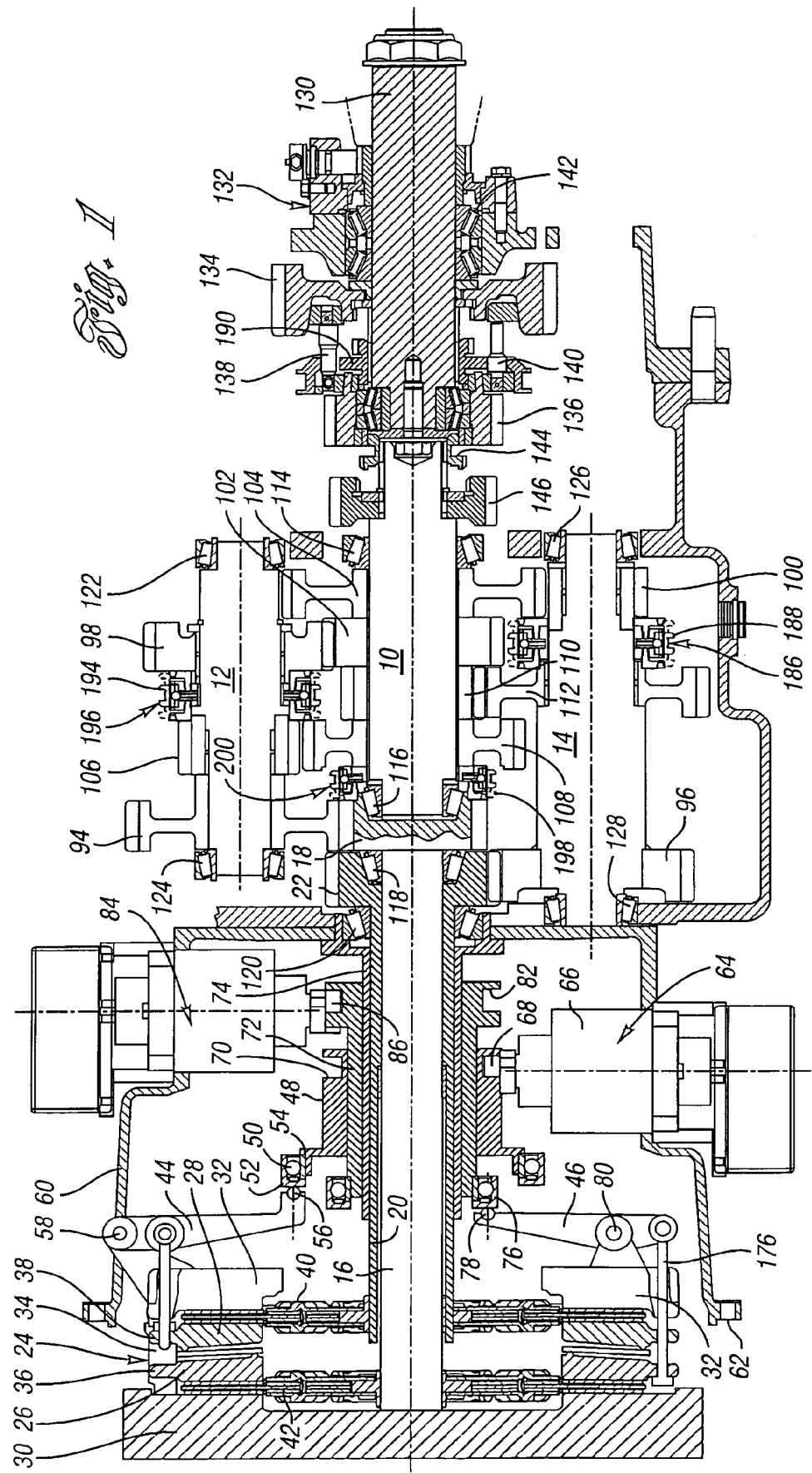
FIG. 1 is a cross-sectional view of a lay shaft transmission that includes the dual clutch assembly of the invention.

A heavy-duty lay shaft transmission is schematically shown in FIG. 1. It includes a mainshaft 10 and a pair of countershafts 12 and 14. Each countershaft has an axis displaced laterally from the mainshaft 10 and mounted parallel to a mainshaft axis. A first torque input shaft 16 is connected driveably to a first torque input gear 18. A second torque input shaft is a sleeve shaft surrounding torque input shaft 16, as shown at 20. A second torque input gear 22 is driveably connected to torque input sleeve shaft 20. The axes of input shafts 16 and 20 coincide with the axis of the mainshaft 10.

The dual clutch assembly of the invention is generally indicated by reference numeral 24. It comprises a first friction clutch plate 26 and a second friction clutch plate 28. A portion of an engine crankshaft flywheel is shown at 30 and a clutch housing or cover is shown at 32. Cover 32, which is secured to flywheel portion 30, functions as a clutch friction element with an annular friction surface. Likewise, flywheel portion 30, which functions as a part of clutch cover 32, has an annular friction surface.

The clutch cover 32 has a peripheral portion that surrounds the clutch friction plates 26 and 28. The peripheral portion has openings, as shown at 34. The outer margins of the friction plates 26 and 28 have projections 36 and 38, which are received in the openings 34 so that the friction plates 26 and 28 rotate with and are driven by the engine crankshaft flywheel portion 30 and the clutch cover 32.

A first friction disk assembly 40 is situated between the friction surface on clutch housing 32 and friction plate 28. A second friction disk assembly 42 is situated between the friction surface on engine crankshaft flywheel portion 30 and friction plate 26.

As will be explained with reference to FIG. 2, clutch actuator levers 44 and 46 selectively control engagement and disengagement of dual clutch assembly 24. The radially inward ends of levers 44 engage an actuator sleeve 48. A ball thrust bearing 50, including an outer race 52 and an inner race 54, is located at the radially inward end of the levers 44.

The outer race 52 engages actuator elements 56. As the sleeve 48 is shifted in a left-hand direction, as viewed in FIG. 1, each lever 44 will pivot about a fulcrum point 58 on clutch housing 32. The dual clutch assembly 24 is surrounded by transmission housing 60, which may be bolted to the engine block of an internal combustion engine by bolts at peripheral locations, as shown at 62.

A first clutch actuator, schematically indicated at 64, includes an electric actuator motor 66 with an armature shaft that carries a clutch actuator element 68, which is received in a groove 70 formed in sleeve 48. As the motor 64 is activated, the sleeve 48 is shifted in a left-hand direction, causing each lever 44 to rotate about a fulcrum point 58 in a clockwise direction as seen in FIG. 1.

The sleeve 48 is mounted on and supported by a second sleeve shaft 72, which in turn is slidably supported by a stationary sleeve shaft 74 secured to the transmission housing 60. The sleeve shaft 72 carries a thrust bearing 76 with an outer race that engages actuator elements 78 at the radially inward ends of levers 46. As the sleeve 72 is shifted in the left-hand direction, each lever 46 is pivoted at a fulcrum point 80 on the clutch cover 32.

The sleeve 72 has an annular groove 82 corresponding to the annular groove 70 for sleeve 48. A second actuator, generally indicated at 84, comprises an electric motor having an armature shaft with an actuator element 86 received in the groove 82. When the sleeve 72 is shifted in a left-hand direction as viewed in FIG. 1, lever 46 is pivoted about pivot point 80 in a counter-clockwise direction.

First torque input shaft 20 is positioned within the support sleeve shaft 74. The sleeve 48, the sleeve 72, the support shaft 74 and torque input shaft 20 are coaxially disposed with respect to second torque input shaft 16. Friction disk assembly 42 is driveably connected to input shaft 16, and friction disk assembly 40 is driveably connected to input shaft 20. Input shaft 16, as mentioned above, is driveably connected to first input gear 18 for the lay shaft transmission and input sleeve shaft 20 is driveably connected to input gear 22, which may have a larger pitch diameter than input gear 18.

A first countershaft gear 94 driveably engages input gear 18, and input gear 22 driveably engages countershaft gear 96. Gear 94 is driveably connected by a keyway or spline to countershaft 12. Countershaft gear 96 is connected similarly to countershaft 14. Countershaft gear 98 is journalled on countershaft 12, and countershaft gear 100 is journalled on countershaft 14.

Two torque output gears 102 and 104 are splined or otherwise driveably connected to mainshaft 10. Torque output gear 102 meshes with countershaft gear 98, and torque output gear 104 meshes with countershaft gear 100.

A first reverse gear 106 is journalled on countershaft 12. A second reverse gear 108 is driveably connected to mainshaft 10. Gears 106 and 108 are in meshing engagement with a reverse idler gear (not shown in FIG. 1). Countershaft gear 96 and second reverse gear 108 rotate in the same direction, since they both engage a common reverse idler gear. Countershaft gear 98 and mainshaft gear 102 rotate in opposite directions.

A third output gear 110 driveably engages countershaft gear 112 journalled on countershaft 14. Gear 110 is driveably connected to mainshaft 10.

Mainshaft 10 is journalled at its right-hand end by a tapered roller thrust bearing 114 in the transmission housing. The left-hand end of the mainshaft 10 is journalled by a tapered roller thrust bearing 116 in a bearing pocket formed in input gear 18. Input gear 18 and input shaft 16 are journalled by a tapered roller thrust bearing 118 in a bearing pocket formed in input gear 22, which in turn is journalled in a bearing opening in the transmission housing 60 by tapered roller thrust bearing 120.

Countershaft 12 is end supported in the transmission housing by tapered roller thrust bearings 122 and 124. Similarly, countershaft 14 is end supported in the transmission housing by tapered roller thrust bearings 126 and 128.

A torque output shaft 130 is axially aligned with mainshaft 10. It is connected driveably to mainshaft 10 by range selector gearing 132, which may have a large diameter torque output gear 134 and a smaller diameter torque output gear 136. These range selector gears are connected driveably to torque output shaft 130 by first and second synchronizer clutch assemblies 138 and 140, respectively. The synchronizer clutch assemblies may be of well known construction. Torque output shaft 130 is journalled in the transmission housing by a tapered roller thrust bearing 142.

Gear 136 is driveably connected to the mainshaft 10 by a sliding clutch sleeve 144 when it is shifted in the right-hand direction, as shown in FIG. 1. When the clutch sleeve 144 is shifted in the left-hand direction, it driveably connects range selector gear 146 to the mainshaft 10. Gears 134, 136 and 146 are in driving engagement with countershaft gearing, not shown in FIG. 1.

Figure 2:
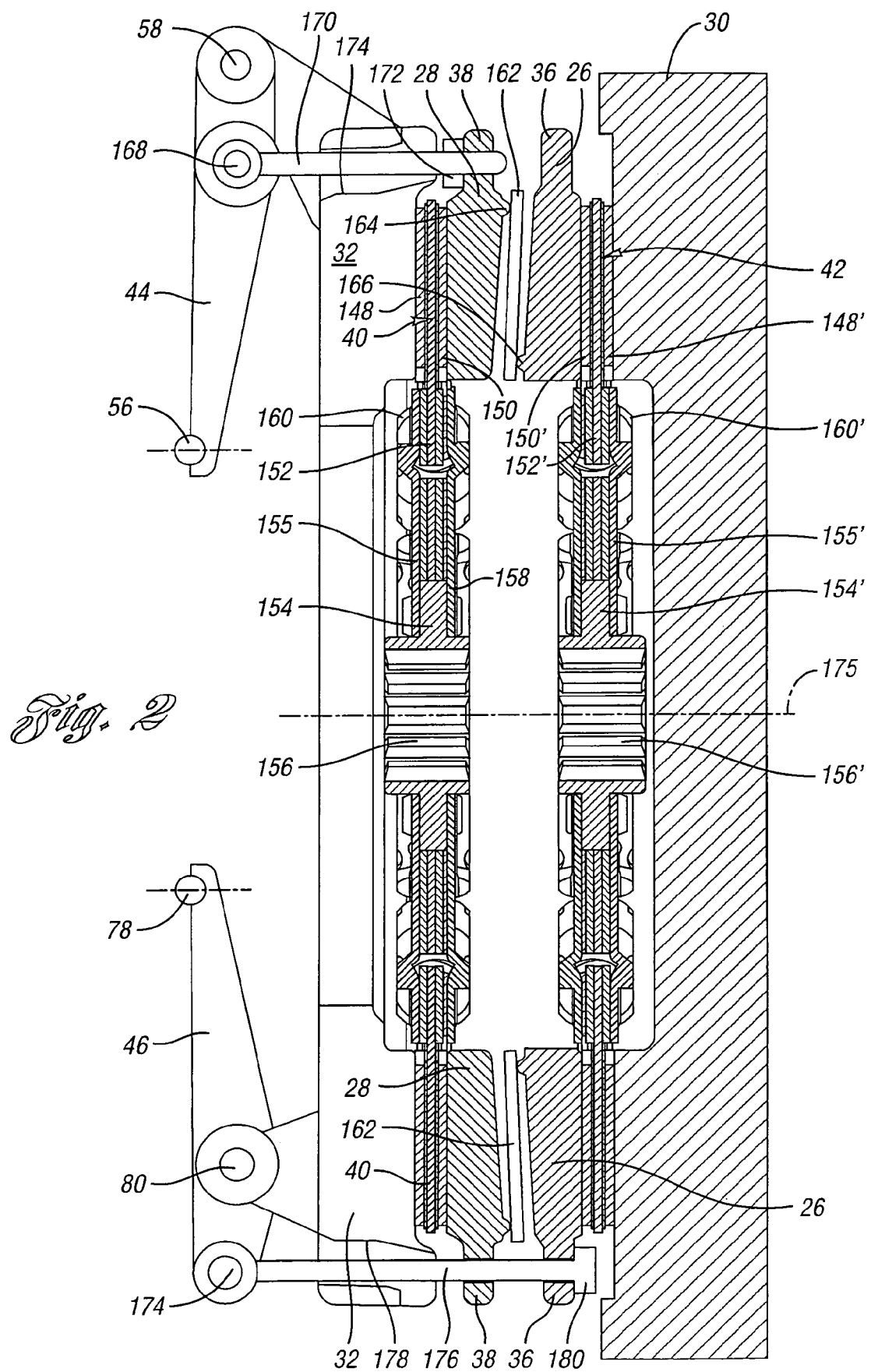
FIG. 2 is a partial cross-sectional view of a normally closed dual clutch assembly for the transmission illustrated in FIG. 1.

The friction disk assembly 40 comprises a pair of annular friction surfaces 148 and 150, as seen in FIG. 2. The friction surfaces are carried by a clutch disk 152, the radially inward end of which is connected to a clutch hub 154. The clutch hub is internally splined by spline 156 to shaft 20.

Figure 5:
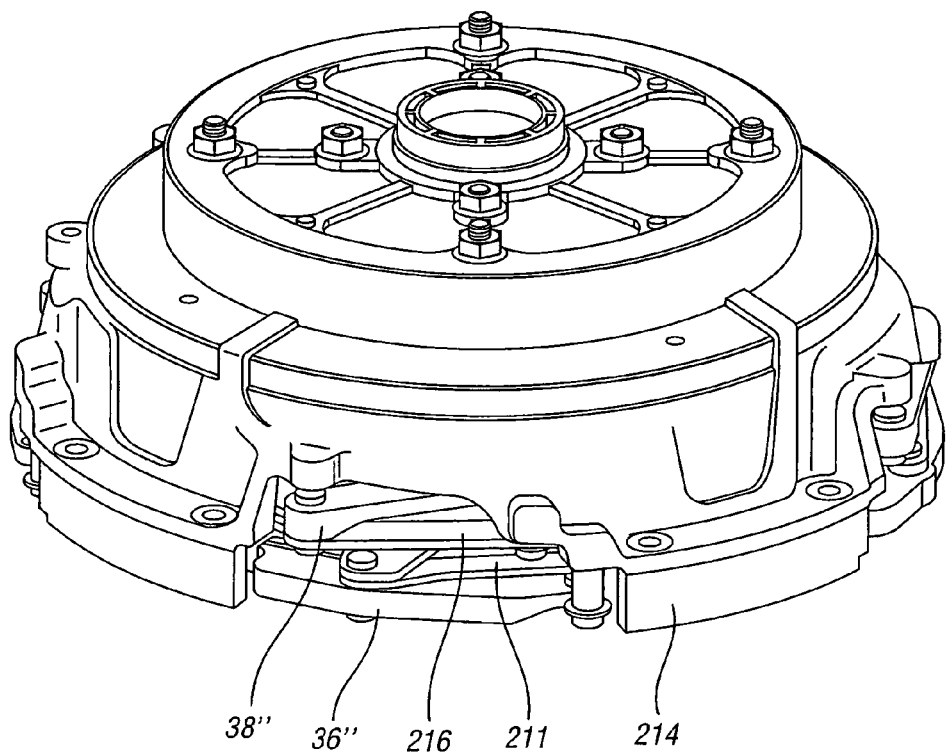
FIGS. 5 and 5a show a prior art dual clutch assembly, which has friction disks with elements corresponding to the friction disks of the dual clutch assembly of the invention.
Figure 5A:
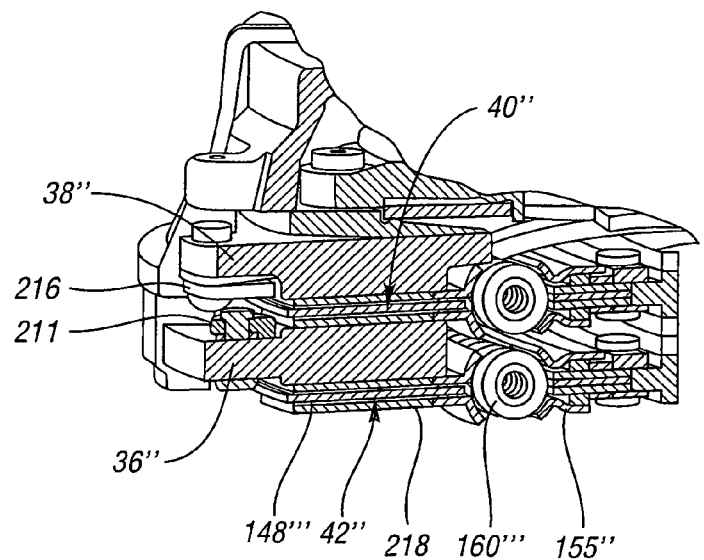

Side plates 155 and 158 are connected directly to the hub 154. Damper springs 160, which will be described with reference to FIGS. 5 and 5a, are situated between the side plates and the clutch disk 152.

Friction disk assembly 42 may be similar in construction to friction disk assembly 40. The elements of the friction disk assembly 42 are identified by reference numerals that are similar to the reference numerals used in the description of friction disk assembly 40, although prime notations are added.

An annular plate spring 162 is disposed between clutch plates 26 and 28. The radially outward margin of the annular plate spring 162 engages the radially outward portion 164 of clutch plate 28. The radially inward margin of the plate spring 162 engages the radially inward portion of clutch plate 26, as shown at 166.

The lever 44, as seen in FIG. 2, is pivoted on the clutch housing 32 at a radially outward location with respect to an intermediate point 168 where the lever 44 is connected pivotally to an actuator rod 170. The rod 170 carries a shoulder 172, which engages clutch plate 28. Rod 170 is received through an opening 174 in projection 38 at the radially outward margin of clutch housing 32.

The lever 44, shown in FIG. 2, may be one of a set of three actuating levers disposed about the axis 175 for the dual clutch assembly. Likewise, lever 46 in FIG. 2 may be one of a set of three actuating levers disposed about the axis 175. Three levers in each set is the preferred arrangement, although a different number of levers in each set could be used depending upon design choice.

When the radially inward element 56 of the lever 44 is shifted by actuator sleeve 48, the shoulder 172 acting against the clutch plate 28 will cause the plate spring 162 to compress, thereby applying a clutch engagement force on the clutch disk 152'. This creates a torque flow path from clutch plate 26 to the clutch hub 154'. Simultaneously, clutch pressure on the clutch plate 28 of the friction disk assembly 40 is relieved, thereby interrupting the friction torque flow path for the clutch disk assembly 40.

Actuator lever 46, which is one of a set of actuating levers as explained previously, is pivoted at 80 to the clutch housing 32 at a location intermediate the ends of the lever 46. The radially outward operating end of lever 46 is pivotally connected at 174 to an actuator rod 176, which extends through an opening 178 in the clutch housing 32. The right-hand end of rod 176 carries a shoulder 180 received through projection 36 of the clutch plate 26. A corresponding opening for the rod 176 is formed in projection 38 of the clutch plate 28.

When the sleeve 72, seen in FIG. 1, engages the radially inward actuator element 78 of the lever 46, the lever 46 is pivoted in a clockwise direction as viewed in FIG. 2, thereby pulling the clutch plate 26 out of engagement with the friction disk assembly 42 and compressing clutch plate 28. Plate spring load is transferred to clutch plate 28 in the manner previously described, thereby frictionally engaging friction disk assembly 40 as the friction disk assembly 42 is released.

Friction disk assembly 42, as viewed in FIG. 1, is engaged as the levers 44 are shifted in a clockwise direction by actuator 64. Movement of the levers 44 in a clockwise direction causes the actuator rods 170 to apply a force on plate 28, which compresses plate spring 162. The plate spring force created as the plate spring is compressed causes clutch plate 26 to frictionally engage clutch disk assembly 42, thereby establishing a torque flow path from the engine to torque input gear 18.

When the actuator 84 shifts levers 46 in a counterclockwise direction, as viewed in FIG. 1, rods 176 pull clutch plate 26 in a right-hand direction thereby compressing plate spring 162. This causes plate 28 to frictionally engage clutch disk assembly 40, thereby establishing a torque flow path from the engine to torque input gear 22.

As clutch disk assembly 40 is engaged, clutch disk assembly 42 is disengaged. Conversely, as clutch disk assembly 42 is engaged, clutch disk assembly 40 is disengaged. The tandem clutch disk assemblies 40 and 42 establish and disestablish two independent torque flow paths from the engine through the gearing and from the gearing to the multiple range gear box 132. The torque flow path for first ratio operation is established as the friction disk assembly 40 is engaged and the friction disk assembly 42 is disengaged. Engine torque is delivered through friction disk assembly 40 to torque input gear 22, which meshes with countershaft gear 96. Synchronizer clutch assembly 186 establishes a driving connection between countershaft 14 and countershaft gear 110 when synchronizer clutch sleeve 188 is shifted in a right-hand direction.

Countershaft gear 112 engages mainshaft gear 110, which drives mainshaft 10. Gear 136 is driveably connected to output shaft 130 through a clutch sleeve 190, which is splined to the output shaft 130. When the sleeve 190 is shifted in a left-hand direction, it driveably engages internal clutch teeth on gear 136.

When clutch disk assembly 40 is disengaged and clutch disk assembly 42 is engaged, a second gear ratio torque flow path is established. Engine torque then is delivered through friction disk assembly 42 to shaft 16 and to gear 18. Gear 18 drives countershaft gear 94. Synchronizer clutch sleeve 194 of synchronizer clutch assembly 196 is shifted in a right-hand direction prior to engagement of clutch disk assembly 42, thereby establishing a driving connection between countershaft gear 98 and countershaft 12. Mainshaft gear 102 is driveably connected to countershaft gear 98.

Third speed ratio operation is achieved by engaging friction disk assembly 40 and releasing friction disk assembly 42. Synchronizer clutch sleeve 188 is shifted in the left-hand direction prior to the engagement and release of the friction disk assemblies for third ratio operation. Engine torque then is delivered through shaft 16 and through synchronizer clutch sleeve 188 to mainshaft 10. Synchronizer clutch sleeve 188 is part of the synchronizer clutch assembly identified generally at 186.

A ratio change from the third ratio to the fourth ratio is achieved by disengaging friction disk assembly 40 and engaging friction disk assembly 42. Synchronizer clutch sleeve 198 on mainshaft 18 is pre-selected and shifted in a left-hand direction at this time. Torque then is delivered from the engine through shaft 16 and through gear 18 directly to mainshaft 10.

To establish reverse drive, synchronizer clutch sleeve 194 of synchronizer clutch assembly 196 is shifted in a left-hand direction, as viewed in FIG. 1, thereby connecting driveably countershaft 12 to reverse drive gear 106. Reverse drive gear 108 and reverse drive gear 106 are driveably connected to a reverse idler gear (not shown in FIG. 1). Torque transmitted to reverse gear drive 108 then drives mainshaft 10 in a reverse direction. During reverse drive, friction disk assembly 42 is engaged and friction disk 40 is disengaged.

During ratio changes, as described in the preceding discussion, the tandem clutch disk assemblies 40 and 42 are applied and released in sequence. Prior to the establishment of each forward drive ratio, the synchronizer clutch assembly corresponding to that ratio is preselected and engaged. After the synchronizer clutch assembly has been engaged, a friction disk assembly 40 or 42 associated with that drive ratio is engaged. In this way, a smooth forward drive ratio shift pattern is achieved without the necessity for interrupting torque by controlling engine fueling or controlling engine spark advance.

In a first operating mode, the tandem clutch assembly shown in FIGS. 1 and 2 is normally open. In this case, the plate spring 162 is not preloaded. Clutch disk assembly 40 is applied at the start of engagement and clutch disk assembly 42 is released. Synchronizer clutch assemblies 196 and 186 are pre-engaged. In a second operating mode of the tandem clutch assembly, shown in FIGS. 1 and 2, the clutch assembly is normally partially closed. This is achieved by loading the plate spring 162 so that both friction disk assemblies 40 and 42 are partially engaged initially. During a launch of the vehicle with the dual clutch assembly in its second operating mode, the synchronizer clutch sleeve 188 is shifted in a right-hand direction and the second speed ratio synchronizer clutch sleeve 194 shifted in a right-hand direction, as viewed in FIG. 1. Torque is distributed to each countershaft during an initial stage of the engagement. The launch torque is shared by both friction disk assemblies 40 and 42 during the initial engagement stage. At that time, both friction disks would be slipping as they transmit driving torque to the torque input gears 22 and 18. After the initial stage of the engagement, friction disk assembly 42 is released by actuator 64 and friction disk assembly 40 is fully applied by actuator 84. As the friction disk assembly 40 becomes fully applied, friction disk assembly 42 is released and synchronizer clutch sleeve 194 remains shifted to the right to establish a driving connection between countershaft gear 94 and countershaft 12. The transmission thus is pre-conditioned for a ratio change to the second ratio as it operates in the first ratio.

Figure 3:
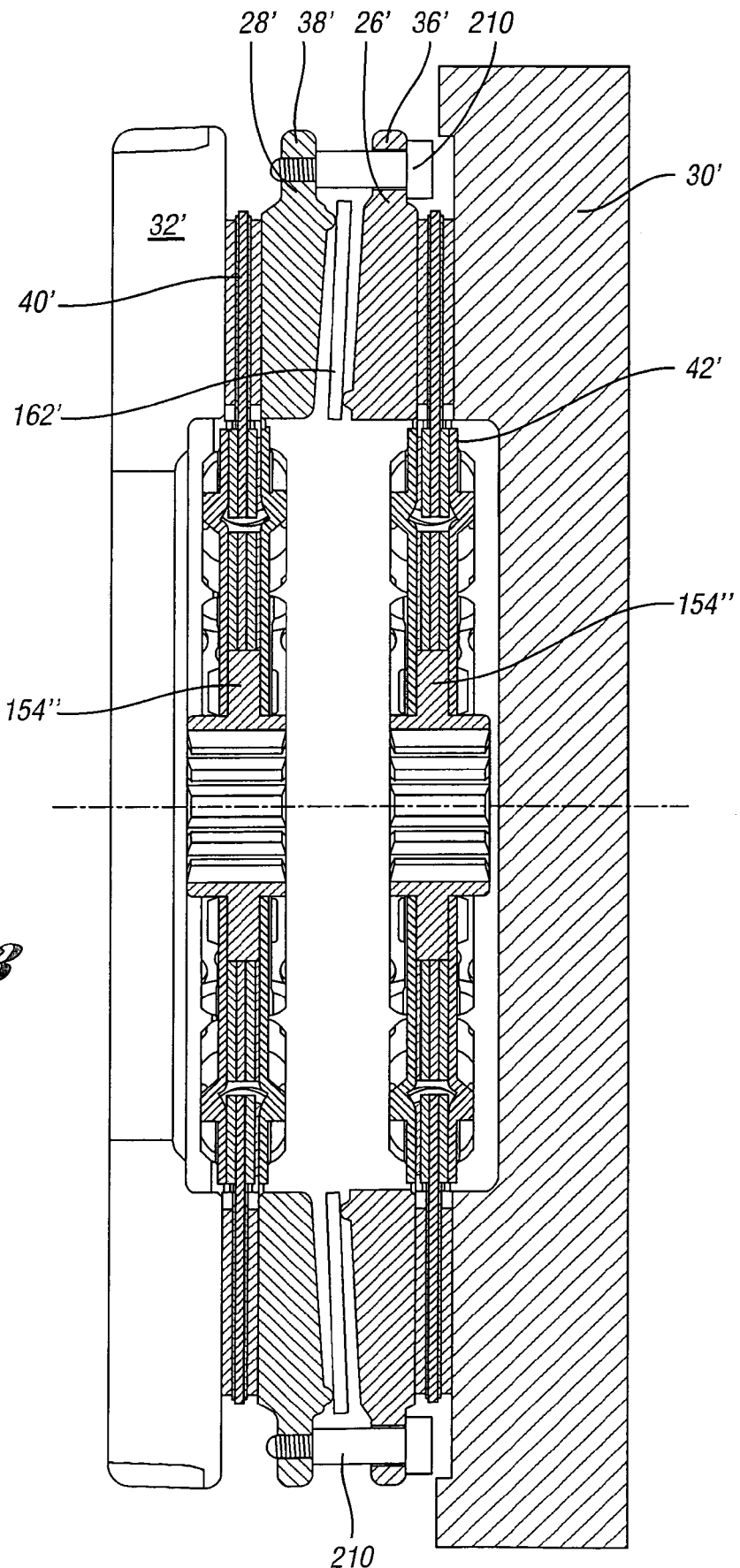
FIG. 3 is a cross-sectional view of an embodiment of the invention that includes a pre-loaded plate spring between normally open friction plates of a dual clutch assembly for the transmission of FIG. 1.
Figure 3A:
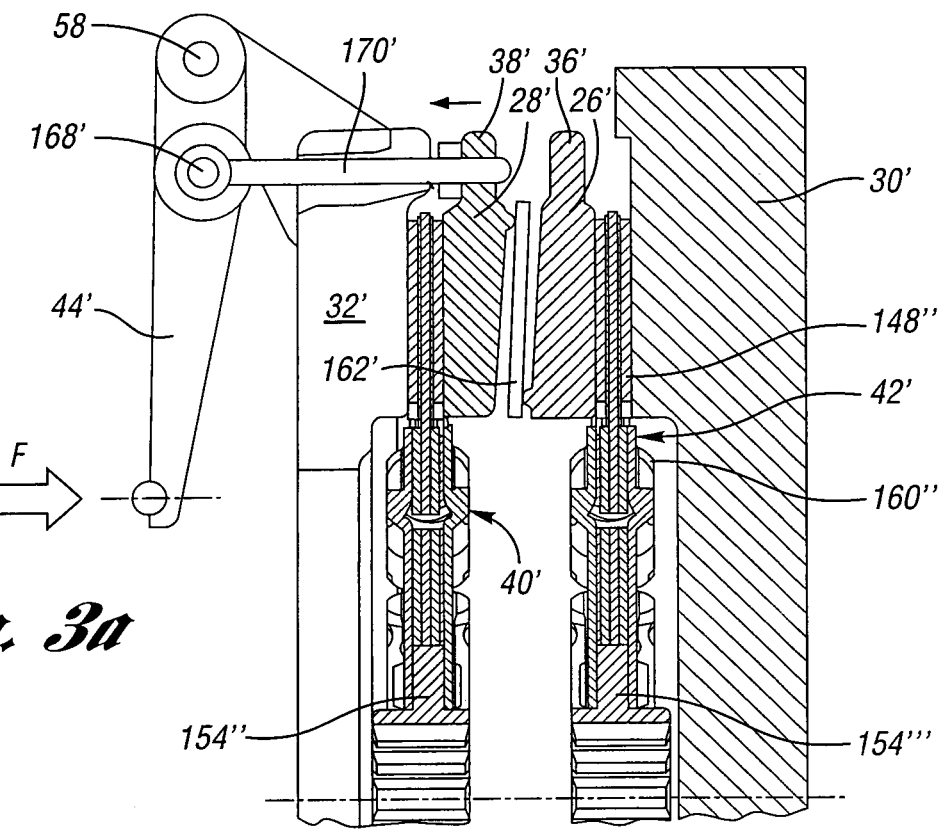
FIGS. 3a and 3b show separate sets of levers for actuating friction plates of the normally open dual clutch assembly of FIG. 1.
Figure 3B:
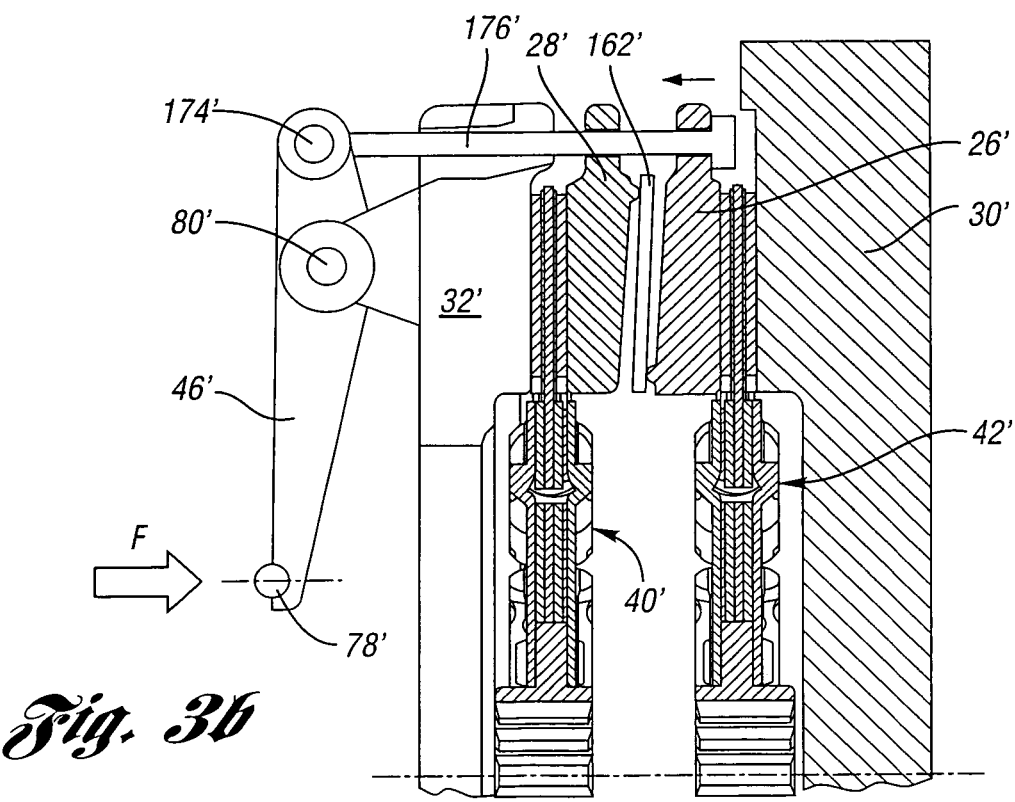

FIGS. 3, 3a and 3b illustrate an embodiment of the invention in which friction disks are normally open. In this instance, plate spring 162' is preloaded. When clutch levers 46' are actuated for first ratio operation under force F, seen in FIG. 3b, actuator rods 176' will pull clutch plate 286 in a left-hand direction, thereby compressing the plate spring 162', which applies a clutch engaging force to the friction disk assembly 40'. Because of the spring characteristics of the plate spring 162', the clutch engaging force may be capped or truncated to a value determined by calibration of the plate spring 162'.

During a ratio change to the second ratio, the force F on the levers 46' is eliminated and a force F on levers 44', as seen in FIG. 3a, is applied, thereby causing the rods 170' to compress plate spring 162'. This applies an engaging force to the clutch disk assembly 42' as the friction disk assembly 40' is released. Again, the maximum clutch engaging force on the friction disk assembly 42' is capped because of the spring characteristics of the plate spring 162'.

In FIGS. 3, 3a and 3b, elements that correspond to elements shown in FIG. 1 are identified by similar reference numerals, although prime notations are added.

The embodiment of FIGS. 3, 3a and 3b comprises a normally open clutch assembly. Each clutch plate 26' and 28' may have a peripheral extension shown at 36' and 38', respectively. The peripheral extensions may have openings that receive threaded adjustment elements or bolts 210, which establish a predetermined spacing between the plates. The spacing is designed so that the plate spring 162' is preloaded to a precalibrated value. When the clutch plates 26' and 28' are assembled in the clutch housing 32', the clutch assembly is in a normally open state. The clutch plates 26' and 28' can be activated by activating levers corresponding to the levers illustrated in FIGS. 2a and 2b (not shown in FIG. 3).

When the actuating lever for clutch plate 28' is activated, clutch plate 28' is shifted in a right-hand direction, as viewed in FIG. 3, thereby compressing plate spring 162', which applies friction disk assembly 42'. When levers 46' are actuated, clutch plate 26 will be pulled to the left, thereby disengaging friction disk assembly 42'. This compresses plate spring 162', thus engaging friction disk assembly 40'.

Figure 4:
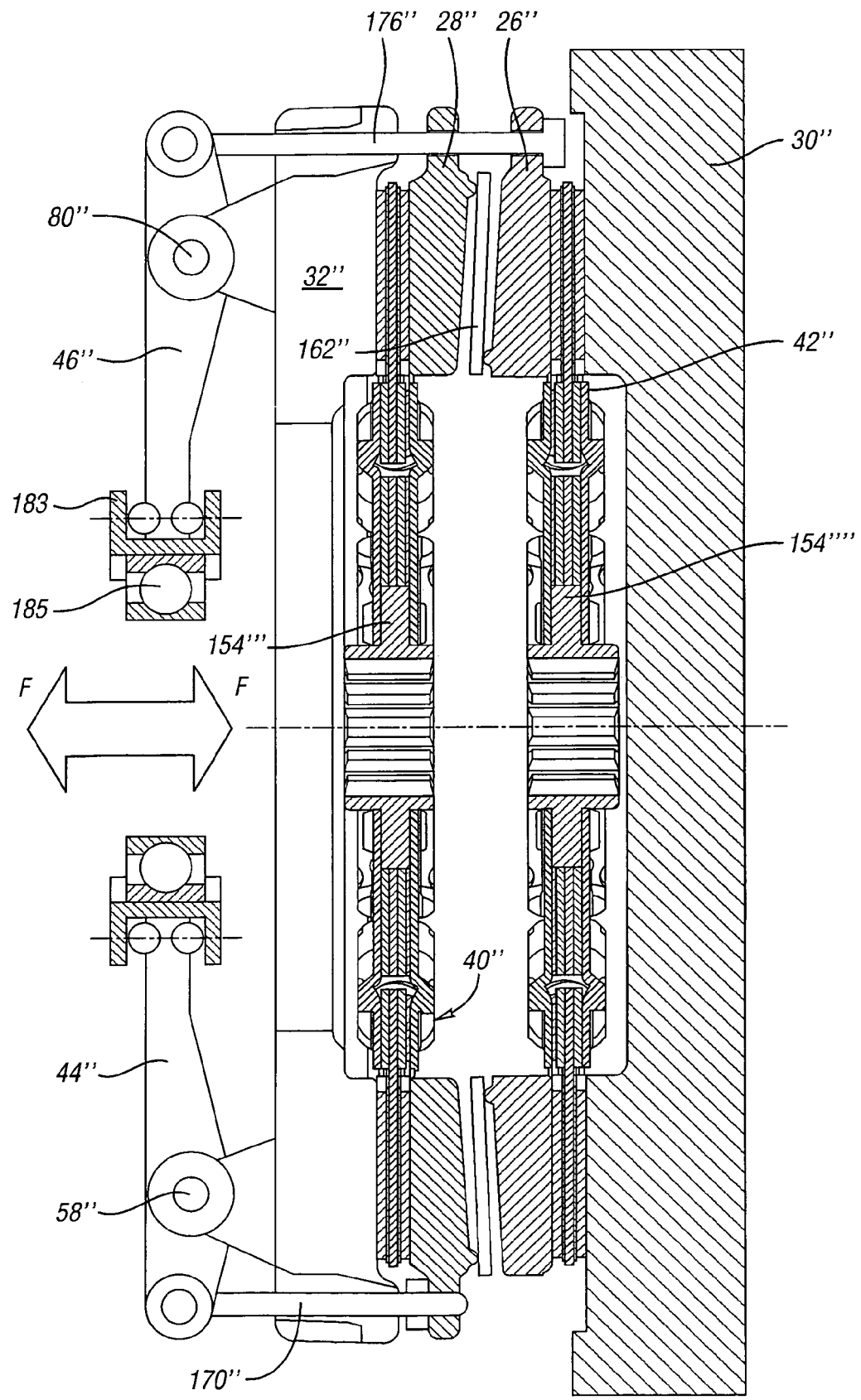
FIG. 4 is an illustration of double acting levers for a dual clutch assembly of the invention wherein a single actuator may be used for each of the lever sets.

Another embodiment of the invention, illustrated in FIG. 4, is a normally open clutch assembly wherein the actuator levers used for engaging and disengaging each friction disk assembly 40" and 42" operate in tandem. In contrast to the dual clutch assemblies illustrated in FIGS. 1, 2, 2a, 2b and 3–3b, the actuator levers 44" and 46", as shown in FIG. 4, can be actuated with a single actuator. As mentioned previously, the embodiment of FIGS. 1 and 2 requires two actuators. Elements of the embodiment of FIG. 4 are identified by the same numerals as corresponding elements of the embodiment of FIGS. 3, 3a and 3b, although double or triple prime notations are added.

The radially inward ends of actuator levers 44" and 46" in FIG. 4 register with an annular groove in bearing element 183, which is connected to the outer race of a roller thrust bearing 185. The inner race of bearing 185 is connected to a sleeve of the type indicated at 48 or 72 in FIG. 1.

As a force F is applied to the bearing 185 in a right-hand direction, as viewed in FIG. 4, levers 46" move in a counter-clockwise direction about pivot point 80" on clutch housing 32". Simultaneously, levers 44" move in a clockwise direction, as viewed in FIG. 4, about pivot point 58" on the clutch housing 32". Counter-clockwise movement of levers 46" will cause the actuator rods 176" to pull clutch plate 26" from engagement with friction disk assembly 42" and compress plate spring 162". Clutch plate 28" then engages friction disk assembly 40''' under the actuating spring force of the plate spring 162''.

If the force F acting on the thrust bearing 184 is reversed and is applied in a left-hand direction as viewed in FIG. 4, levers 44'' will move in a counter-clockwise direction thereby pushing friction clutch plate 28'' out of engagement with friction disk assembly 40''' while compressing plate spring 162''. The plate spring force will act on the clutch plate 26'', thereby engaging friction disk assembly 42''.

Figure 1A:
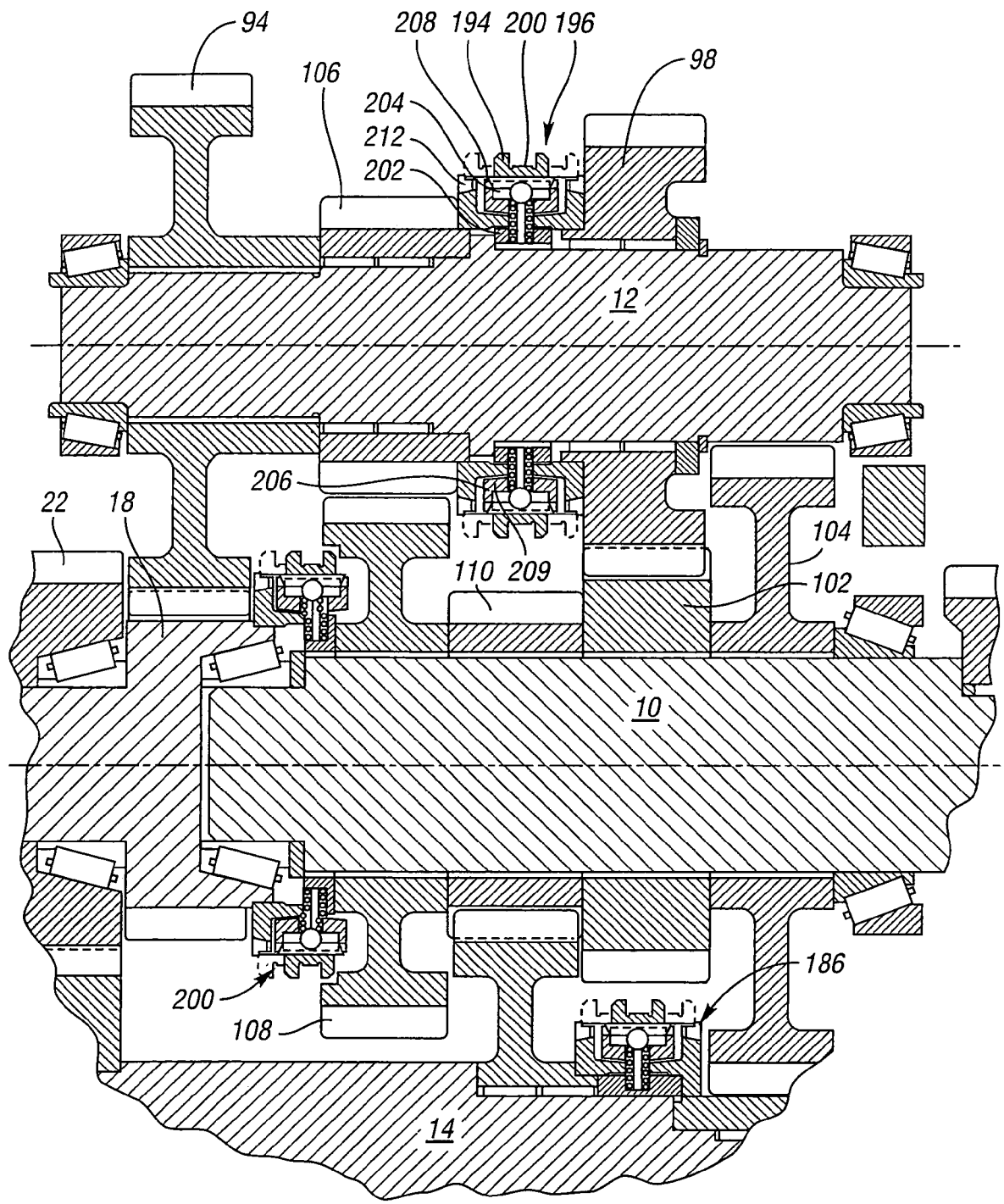
FIG. 1a is an enlarged view of a synchronizer assembly used in the lay shaft gearing shown in FIG. 1.

The synchronizer clutch assemblies illustrated in FIG. 1 may be of well known design. An enlarged view of the synchronizer clutch assembly 196 is illustrated in FIG. 1a. The synchronizer clutch sleeve 194 has a groove 200, which receives a shift fork carried by a shift rail (not shown) in FIG. 1. The sleeve 194 is internally splined on an externally splined synchronizer clutch hub 202. The internally splined synchronizer clutch sleeve 194 has a spring loaded detent connection to thrust bars 204. The thrust bars engage a blocker ring 206, which has external blocker ring teeth 208 located adjacent teeth 212 carried by gear 106. The blocker ring 206 has an internal cone surface that frictionally engages an external cone surface 209 on the gear 106. The axial force transmitted to the synchronizer blocker ring by the detent force acting on the thrust bars will cause the gear 106 to accelerate until it is brought into synchronism with countershaft 12. At that instant, the blocker ring will index rotatably to align the blocker ring teeth with the internal spline teeth of sleeve 194. After synchronism is established, the synchronizer clutch sleeve 194 will pass through the blocker ring teeth into engagement with external clutch teeth 212 on the gear 106. For a description of a synchronizer of this type, reference may be made to U.S. Pat. No. 5,309,782. Synchronizers 186 and 200 may be similar in design to the synchronizer 196.

FIGS. 5 and 5a disclose a known clutch design for driveably connecting the friction plates of the tandem clutch assembly to a rotating clutch housing. A similar driving connection between the clutch plates and the clutch housing of the design of FIG. 1 can be used in the dual clutch assembly of the invention.

In the known design of FIGS. 5 and 5a, a radial portion of a first friction plate is shown at 38'', and a radial portion of a second friction plate is shown at 36''. A drive strap 211 is pinned at one end thereof to plate portion 36'' and is connected at its other end to rotary clutch housing 214, which would correspond to the clutch housing 32 of the construction of FIGS. 1 and 2. A second drive strap 216 is driveably connected to portion 38'' of the companion clutch plate. The other end of the strap 216 is connected driveably to the rotary clutch housing 214.

The damper springs 160, seen in FIG. 2, may be similar to the known damper spring construction illustrated in FIG. 5a. A series of damper springs 160''', seen in FIG. 5a, is located in damper spring plates 155'', which correspond to the plates 155 and 155' of FIG. 2. Clutch plate 148''' has openings that receive the damper springs 160'''. Plates 155'' are secured to the clutch hub. Torque is transmitted through the damper springs 160''' to the clutch plate 148''' which carries friction material 218 engageable with clutch plate 36''' and with an adjacent surface of an engine flywheel (not shown). The clutch housing is bolted to the engine flywheel.

BRIEF SUMMARY OF THE OPERATING SEQUENCE

Prior to launch of the vehicle from a standing start, synchronizer clutch sleeve 188 for the synchronizer clutch 186 is shifted in a right-hand direction, while the actuators 64 and 84 are adjusted to their clutch release positions. Likewise, synchronizer clutch sleeve 194 is shifted in the right-hand direction to its second ratio position. At this time, according to one operating mode, the launch from a standing start is begun by partially engaging both friction disk assemblies 42 and 40, thereby effecting a slipping state for the friction disk assemblies. Engine torque is delivered to both input shafts 16 and 20 at this time so that the friction disks share initially the launching torque load at the beginning of the launch. At a later instant in the initial launch of the vehicle, actuator 84 shifts levers 46 in a clockwise direction, as viewed in FIG. 2. The plate spring 162 is deflected, thereby imparting a clutch engagement force on clutch plate 28 as friction disk assembly 42 is disengaged. When friction disk assembly 40 is fully engaged and friction disk assembly 42 is fully disengaged, the torque flow path for the first gear ratio is fully established. Synchronizer clutch 196, which was preselected for first ratio operation, remains engaged for second ratio operation. In another operating mode, friction disk assembly 40 is applied at the start of a launch and friction disk assembly is disengaged.

To achieve a ratio change from the first ratio to the second ratio, clutch disk assembly 42 becomes activated and clutch disk assembly 40 becomes deactivated. This is done by pivoting levers 44 in a counter-clockwise direction, as viewed in FIG. 2. This causes levers 44 to push clutch plate 28, thus loading plate spring 162. The load of the spring is transmitted through clutch plate 26 to clutch disk assembly 42. While the transmission is operating in its second ratio with synchronizer clutch 196 is engaged, the first ratio synchronizer clutch is disengaged and the third ratio synchronizer clutch 200 is preselected for a third ratio operation as clutch sleeve 188 is shifted in the left-hand direction. To accomplish a ratio change from the second ratio to the third ratio, the levers 44 and 46 disengage disk assembly 42 and engage disk assembly 40. While operating in the third ratio, fourth gear synchronizer clutch 200 is preselected for fourth ratio operation. This is accomplished by shifting synchronizer clutch sleeve 198 in a left-hand direction, as seen in FIG. 1. To complete the ratio change from the third ratio to the fourth ratio, clutch disk assembly 42 again is activated and clutch disk assembly 40 is deactivated by the actuating levers 44 and 46.

During operation in the four forward driving ratios, torque input sleeve shaft 20 delivers torque during first ratio and third ratio operation. Torque input shaft 16 delivers torque through the transmission during second ratio and fourth ratio operation.

To achieve reverse drive, it is necessary to activate only clutch disk assembly 42, while clutch disk assembly 40 is in an open state. Engine torque then is delivered through clutch disk assembly 42 and through the input shaft 16 to input gear 18, which drives countershaft 12 and reverse gear 106. As previously indicated, reverse gear 106 meshes with a reverse drive pinion. The reverse drive pinion, in turn, engages reverse drive gear 108, which is splined to mainshaft 10.

The operating sequence for a vehicle launch, as previously indicated, may initially use both friction disk assemblies 40 and 42 during the initial stage of the launch. Wear of the friction surfaces for the disk assemblies 40 and 42 will then occur at a lower rate. Provision may be made for equalizing the wear by monitoring the angular displacement of the levers 44 and 46. The amount of the displacement for each set of levers will vary depending upon the wear of the friction surfaces of the clutch disk assemblies. If the travel for one set of levers is increased relative to the travel for the other set of levers, that condition would indicate unequal wear of the friction surfaces of the clutch disks. The actuators 64 and 84 can be calibrated to respond to any difference between the travel for each set of levers by altering the slip time of each friction disk during a subsequent launch.

The clutch structure illustrated in FIGS. 1 and 2 may operate alternately in a normally open mode. At the beginning of a launch, both friction disk assemblies 40 and 42 are deactivated and plate spring 162 is not loaded. Clutch disk assembly 40 can be activated for first speed ratio operation by applying a force on levers 46, thereby pivoting levers 46 in a counter-clockwise direction as viewed in FIG. 1. Actuator rod 176 then will pull clutch plate 26 out of engagement with friction disk assembly 42, thereby loading the plate spring 162 and engaging the friction disk assembly 40. This causes engine torque to be delivered to the torque input sleeve shaft 20. Synchronizer clutch assembly 196 on countershaft 12 is preselected for a second gear operation at this time, as explained previously.

During a ratio change to the second ratio, a force is applied to levers 44. This pushes clutch plate 28 thereby loading spring plate 162 and engaging clutch disk assembly 42.

A ratio change to the third ratio from the second ratio and a ratio change to the fourth ratio from the third ratio are executed in a clutch engagement and release pattern that is similar to the clutch engagement and release pattern for the first and second ratios.

In the embodiment of FIGS. 3, 3*a* and 3*b*, the clutch disks assemblies 40' and 42' are normally open. The clutch plates 28' and 26' are secured together by adjusting bolts 210, thereby preloading plate spring 162". In this way, the initial friction torque level upon engagement of friction disk assemblies 42' and 40' can be precalibrated to meet specific operating conditions.

Although embodiments of the invention have been described, it will be apparent to a person skilled in the art that modifications may be made without departing from the scope of the invention. All such modifications and equivalents thereof are intended to be covered by the following claims.

What is claimed is:

1. A dual friction clutch assembly for a multiple-ratio geared transmission in a powertrain for an engine driven vehicle, the clutch assembly comprising:
   a clutch housing driveably connected to the engine;
   a first clutch friction disk connected to a first torque input shaft and forming in part a first torque flow path through the transmission;
   a second clutch friction disk connected to a second torque input shaft and forming in part a second torque flow path through the transmission;
   first and second clutch plates connected to the clutch housing adjacent the first and second friction disks, respectively;
   a spring element disposed between the first and second clutch plates;
   the clutch housing having first and second friction surfaces adjacent the first and second friction disks, respectively;
   a first actuator lever pivotally connected to the clutch housing for applying a clutch assembly engaging force to the second clutch plate whereby the first friction disk is activated; and
   a second actuator lever pivotally connected to the clutch housing for applying a clutch assembly engaging force to the first clutch plate whereby the second friction disk is activated.

2. The dual friction clutch assembly set forth in claim 1 including first and second clutch actuators connected driveably to the first and second actuator levers, respectively;
   the first friction disk being deactivated and the second friction disk being activated when the second actuator lever is shifted by the second actuator;
   the second friction disk being deactivated and the first friction disk being activated when the first actuator lever is shifted by the first actuator.

3. The dual friction disk assembly set forth in claim 2 wherein the spring element is an annular plate spring with inner and outer margins, one margin engaging the first clutch plate and another margin engaging the second clutch plate whereby spring force developed by application of the engaging force to the first clutch plate activates the second friction disk.

4. The dual friction clutch assembly set forth in claim 3 wherein the first friction disk has a disk hub driveably connected to the first torque input shaft for the transmission and the second friction disk has a disk hub driveably connected to the second 'torque input shaft for the transmission.

5. The dual friction clutch assembly set forth in claim 4 wherein the first and second torque input shafts are concentrically disposed, one torque input shaft being a sleeve shaft surrounding another torque input shaft.

6. The dual friction clutch assembly set forth in claim 3 wherein the first and second torque input shafts are concentrically disposed, one torque input shaft being a sleeve shaft surrounding another torque input shaft.

7. The dual friction clutch assembly set forth in claim 6 wherein the first clutch actuator includes a first lever actuator sleeve mounted concentrically with respect to the first and second torque input shafts.

8. The dual friction clutch assembly set forth in claim 7 wherein the second clutch actuator includes a second lever actuator sleeve mounted concentrically with respect to the first and second torque input shafts.

9. The dual friction disk assembly set forth in claim 2 wherein the spring element is an annular plate spring with inner and outer margins, one margin engaging the first clutch plate and another margin engaging the second clutch plate whereby the spring force developed by application of the engaging force to the second clutch plate activates the first friction disk.

10. The dual friction clutch assembly set forth in claim 1 wherein the clutch plates are secured together with adjusting elements to form a clutch plate assembly with a calibrated preload on the spring element.

11. The dual friction clutch assembly set forth inn claim 1 wherein the spring element is an annular plate spring with inner and outer margins, one margin engaging the first clutch plate and another margin engaging the second clutch plate whereby spring force developed by application of the engaging force to the first clutch plate activates the second friction disk.

12. The dual friction clutch assembly set forth in claim 11 wherein the first and second torque input shafts are concentrically disposed, one torque input shaft being a sleeve shaft surrounding another torque input shaft.

13. The dual friction clutch assembly set forth in claim 12 wherein the second clutch actuator includes a second lever actuator sleeve mounted concentrically with respect to the first and second torque input shafts.

14. The dual friction clutch assembly set forth in claim 1 wherein the spring element is an annular plate spring with inner and outer margins, one margin engaging the first clutch plate and another margin engaging the second clutch plate whereby the spring force developed by application of the engaging force to the second clutch plate activates the first friction disk.

15. A dual friction clutch assembly for a multiple-ratio geared transmission in a powertrain for an engine driven vehicle, the clutch assembly comprising:
   a clutch housing driveably connected to the engine;
   a first clutch friction disk connected driveably to a first torque input shaft for the transmission;
   a second clutch friction disk connected driveably to a second torque input shaft for the transmission;
   first and second clutch plates connected to the clutch housing adjacent the first and second friction disks, respectively;
   a spring element disposed between the first and second clutch plates;
   the clutch housing having first and second friction surfaces adjacent the first and second friction disks, respectively; and
   a first actuator lever connected pivotally to the clutch housing for applying selectively a clutch engaging force to the first clutch plate and a second actuator lever connected pivotally to the clutch housing for applying a clutch engaging force to the second clutch plate;
   a common actuator and common actuator sleeve for the first and second actuator levers, the common actuator sleeve engaging each actuator lever at a radially inward location on each actuator lever relative to the torque input shafts;
   a radially outward location on each actuator lever relative to the radially inward location being mechanically connected by a separate force transmitting element to a separate one of the clutch plates;
   the pivotal connections of the actuator levers to the clutch housing being located intermediate the radially inward and radially outward locations whereby the first and second friction disks are selectively activated and deactivated as the common actuator is adjusted.

16. The dual friction clutch assembly set forth in claim 15 whereby the actuator levers are adjusted in one direction to activate one of the friction disks and deactivate another of the friction disks and whereby the actuator levers are adjusted in an opposite direction to deactivate the one friction disk and activate the other friction disk.

17. The dual friction clutch assembly set forth in claim 16 wherein the common actuator sleeve is disposed concentrically about the first and second torque input shafts.

18. The dual friction clutch assembly set forth in claim 15 wherein the clutch plate assembly adjusting elements establish a predetermined spacing between the clutch plates.

19. A dual friction clutch assembly for a multiple-ratio geared transmission in a powertrain for an engine driven vehicle, the clutch assembly comprising:
   a clutch housing driveably connected to the engine;
   a first clutch friction disk forming in part a first torque flow path through the transmission;
   a second clutch friction disk forming in part a second torque flow path through the transmission;
   first and second clutch plates connected to the clutch housing adjacent the first and second friction disks, respectively;
   a spring element disposed between the first and second clutch plates; the clutch housing having first and second friction surfaces adjacent the first and second friction disks, respectively;
   a first actuator lever applying a clutch assembly engaging force to the second clutch plate whereby the first friction disk is activated; and
   a second actuator lever applying a clutch assembly engaging force to the first clutch plate whereby the second friction disk is activated;
   first and second clutch actuators connected driveably to the first and second actuator levers, respectively;
   the first friction disk being deactivated and the second friction disk being activated when the second actuator lever is shifted by the second actuator;
   the second friction disk being deactivated and the first friction disk being activated when the first actuator lever is shifted by the first actuator;
   the spring element being an annular plate spring with inner and outer margins, one margin engaging the first clutch plate and another margin engaging the second clutch plate whereby spring force developed by application of the engaging force to the first clutch plate activates the second friction disk and the spring force developed by application of the engaging force to the second clutch plate activates the first friction disk;
   the first friction disk having a disk hub driveably connected to a first torque input shaft for the transmission and the second friction disk having a disk hub driveably connected to a second torque input shaft for the transmission;
   the transmission including multiple gear elements, each torque flow path having separate gear elements; and
   a transmission clutch for each of the separate gear elements for selectively establishing a torque flow path therethrough;
   each transmission clutch being preselected and engaged to condition the separate gear elements for torque delivery in advance of activation of a friction disk in the torque flow path for the preselected transmission clutch.

20. A dual friction clutch assembly for a multiple-ratio geared transmission in a powertrain for an engine driven vehicle, the clutch assembly comprising:
   a clutch housing driveably connected to the engine;
   a first clutch friction disk connected driveably to a first torque input shaft for the transmission;
   a second clutch friction disk connected driveably to a second torque input shaft for the transmission;
   first and second clutch plates connected to the clutch housing adjacent the first and second friction disks, respectively;
   a spring element disposed between the first and second clutch plates;
   the clutch housing having first and second friction surfaces adjacent the first and second friction disks, respectively;
   a common actuator including actuator levers pivoted on the clutch housing for applying selectively a clutch engaging force to the first and second clutch plates whereby the first and second friction disks are selectively activated and deactivated by the common actuator;
   the common actuator being adjusted in one direction to activate one of the friction disks and deactivate another of the friction disks and adjusted in an opposite direction to deactivate the one friction disk and activate the other friction disk;

the transmission including multiple gear elements, each gear element defining in part a separate torque flow path; and a transmission clutch for each of the separate gear elements for selectively establishing a torque flow path therethrough;

each transmission clutch being preselected and engaged to condition the separate gear elements for torque delivery in advance of activation of a friction disk in a torque flow path for the preselected transmission clutch.

21. A dual friction clutch assembly for a multiple-ratio geared transmission in a powertrain for an engine driven vehicle, the clutch assembly comprising:

a clutch housing driveably connected to the engine;

a first clutch friction disk forming in part a first torque flow path through the transmission;

a second clutch friction disk forming in part a second torque flow path through the transmission;

first and second clutch plates connected to the clutch housing adjacent the first and second friction disks, respectively;

a spring element disposed between the first and second clutch plates;

the clutch housing having first and second friction surfaces adjacent the first and second friction disks, respectively;

a first actuator lever applying a clutch assembly engaging force to the second clutch plate whereby the first friction disk is activated; and a second actuator lever applying a clutch assembly engaging force to the first clutch plate whereby the second friction disk is activated;

first and second clutch actuators connected driveably to the first and second actuator levers, respectively;

the first friction disk being activated when the second actuator lever is shifted by the second actuator;

the second friction disk being activated when the first actuator lever is shifted by the first actuator;

the spring element being an annular plate spring with inner and outer margins, one margin engaging the first clutch plate and another margin engaging the second clutch plate whereby spring force developed by application of the engaging force to the first clutch plate activates the second friction disk and the spring force developed by application of the engaging force to the second clutch plate activates the first friction disk;

the first friction disk having a disk hub driveably connected to a first torque input shaft for the transmission and the second friction disk having a disk hub driveably connected to a second torque input shaft for the transmission;

the transmission including multiple gear elements, each torque flow path having separate gear elements; and a transmission clutch for each of the separate gear elements for selectively establishing a torque flow path therethrough;

each transmission clutch being preselected and engaged to condition the separate gear elements for torque delivery in advance of activation of a friction disk in the torque flow path for the preselected transmission clutch.

* * * * *

UNITED STATES PATENT AND TRADEMARK OFFICE
CERTIFICATE OF CORRECTION

PATENT NO. : 7,204,166 B2 Page 1 of 1
APPLICATION NO. : 10/983531
DATED : April 17, 2007
INVENTOR(S) : Daniel V. Gochenour It is certified that error appears in the above-identified patent and that said Letters Patent is hereby corrected as shown below:

Column 12, Line 55, Claim 11

Delete "inn" and insert therefor -- in --.

Signed and Sealed this

Thirty-first Day of July, 2007

JON W. DUDAS
*Director of the United States Patent and Trademark Office*